(12) United States Patent
Kazmi et al.

(10) Patent No.: US 8,520,579 B2
(45) Date of Patent: Aug. 27, 2013

(54) TOKEN BASED RADIO RESOURCE MANAGEMENT

(75) Inventors: Muhammad Kazmi, Bromma (SE); Jingyi Liao, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1301 days.

(21) Appl. No.: 12/158,962

(22) PCT Filed: Dec. 22, 2005

(86) PCT No.: PCT/SE2005/002031
§ 371 (c)(1), (2), (4) Date: Jul. 8, 2008

(87) PCT Pub. No.: WO2007/073267
PCT Pub. Date: Jun. 28, 2007

(65) Prior Publication Data
US 2009/0010229 A1 Jan. 8, 2009

(51) Int. Cl.
*G08C 17/00* (2006.01)

(52) U.S. Cl.
USPC ............. 370/311; 370/318; 370/336; 455/69; 455/127.1; 455/522

(58) Field of Classification Search
None
See application file for complete search history.

(56) References Cited

U.S. PATENT DOCUMENTS

| | | | | |
|---|---|---|---|---|
| 5,347,167 A | * | 9/1994 | Singh | 307/125 |
| 6,928,273 B2 | * | 8/2005 | Nitta | 455/127.5 |
| 2003/0134654 A1 | * | 7/2003 | Masuda et al. | 455/522 |
| 2003/0217295 A1 | * | 11/2003 | Sadowski | 713/300 |
| 2005/0053039 A1 | * | 3/2005 | Dewan et al. | 370/334 |
| 2005/0181837 A1 | * | 8/2005 | Sakai | 455/567 |
| 2008/0130593 A1 | * | 6/2008 | Scheinert et al. | 370/337 |

* cited by examiner

*Primary Examiner* — Chi Pham
*Assistant Examiner* — Shick Hom

(57) ABSTRACT

The invention relates to a method of globally balancing the transmit power in a cellular radio system with tight reuse of frequencies, to a central controller node, and to an access point that in combination with conventional power control schemes balances the downlink transmission power on reused frequencies in order to balance co-channel interference in a multi-cell environment. The power balancing scheme dynamically assigns a token to or takes a token away from an individual reused radio channel based on quality of, or based on transmission power in the channel. A token, if taken away from the channel, inhibits conventional power control thereby freezing the transmission power in the channel on its current power level. A token, if assigned or re-assigned to channel, re-assumes conventional power control thereby allowing dynamic variation of the transmission power in the channel in accordance with the conventional power control.

22 Claims, 6 Drawing Sheets

Pre-assignment of token based on transmit power

Pre-assignment of token based on transmit power

TOKEN BASED RADIO RESOURCE MANAGEMENT

TECHNICAL FIELD OF THE INVENTION

The present invention relates to a method of token based radio resource management in a radio based cellular network, a central node and an access point using the method.

In particular the invention relates to a method for dynamic allocation of transmission power to user equipments (UE:s) in a multi-cellular interference limited radio system with tight frequency reuse using a radio frequency (RF) power balancing system.

BACKGROUND

The aim of a power allocation scheme is to dynamically allocate the RF power to the UE:s in a cell in order to balance the downlink co-channel interference in multi-cell environment. This is particularly important in a multi-cell orthogonal frequency division multiple access (OFDMA) based environment with tight frequency reuse, e.g. reuse 1 or reuse 3.

In an OFDMA based system the available bandwidth is sub-divided into several chunks of frequencies. A chunk is usually a two-dimensional radio resource, defined in both time and frequency domain and comprises of orthogonal sub-carriers. Each UE estimates the downlink channel quality on each chunk and reports the measured quality, e.g. a channel quality indicator (CQI), to the network. The CQI can be measured by an UE on pilot symbols. Downlink channel quality measurements can use any other suitable measurable signal that can depict the downlink instantaneous channel quality. Based on the reported CQI a radio network controller (RNC) dynamically allocates the chunks to be used for transmission of data to the UE:s in the downlink. To allocate chunks the RNC uses any conventional frequency allocation scheme. Base stations, also referred to as access points (AP:s), transmits on the selected chunks using a certain power level which is determined by a conventional power control scheme managed by the RNC.

DESCRIPTION OF RELATED ART

The impact of co-channel interference in multi-cell OFDMA has been studied, Ref [1]. Some power allocation schemes have been investigated for OFDMA based cellular systems. A power allocation scheme based on path loss in a wireless ad hoc network based on OFDMA has been proposed, Ref [2]. Power control schemes with the aim of balancing carrier to interference (CIR) in different access technologies have been studied, Ref [3] and Ref [4]. In these schemes the main purpose is to allocate the power in a way that the same CIR is maintained on all the links with the same quality of service (QoS) requirement. These schemes tend to minimize co-channel interference. Power control based on CQI reports is proposed for OFDMA in Ref [5]. The power control scheme in [5] does not address a multi-cell OFDMA scenario where power increase in one cell will generate interference in the other cells.

Problems with Existing Solutions

Power control or power allocation has been extensively studied for CDMA systems. The power allocation schemes currently used or proposed have the following drawbacks:

Power allocation scheme based on path gain does not take into account the channel quality, Ref [2].

In real networks the radio links even with same quality of service (e.g. frame erasure ration, FER) may require different CIR targets in order to meet their quality targets. Hence power allocation schemes based on CIR balancing, Ref [3] and Ref [4], which aim to minimize the co-channel interference do not address the issue of fulfilling the ultimate quality targets (e.g. FER).

CQI based power control in OFDMA, Ref [5], doesn't cover the situation of a multi-cell environment where a power increase in a cell will cause interference in other cells. In the worst case, there will be a non-desired global increase or decrease in power in all of the cells. This is problem that needs to be solved.

Fixed power allocation in the downlink of a radio channel may lead to degradation of the cell's throughput in case the transmission power in the downlink power is lower than the level required to sustain a channel quality corresponding to the current service. Similarly wastage of downlink power resource in case fixed allocated power is larger than the required power.

SUMMARY OF THE INVENTION

An object of the invention is to provide, in a cellular radio system with tight reuse of frequencies, a method, a central controller node, and an access point that in combination with conventional power control schemes balances the downlink transmission power on the reused frequencies in order to balance co-channel interference in a multi-cell environment.

In a wide sense the invention relates to a power balancing scheme of the above kind that: (i) takes the instantaneous channel variation and co-channel interference into account and (ii) satisfies the throughput requirements of the different cells when allocating downlink power to the UE:s.

Still an object of the invention is to provide a power balancing scheme that provides said balancing by dynamically assigning a token to or taking away a token from an individual reused radio channel based on quality of or transmission power in the channel, a token: (i), if taken away from the channel, inhibiting conventional power control thereby freezing the transmission power in the channel on its current power level, and (ii), if assigned or re-assigned to channel, re-assuming the conventional power control thereby allowing dynamic variation of the transmission power in the channel in accordance with the conventional power control. The conventional power control is thus inhibited (aborted) in a re-used channel from which the token was taken away.

According to the invention token assignment is based either on some predefined pattern, or on radio related measurement reports from access points and user equipments, or on radio transmission power level used at an access point. If based on transmission power level, power balancing is quicker compared to the case which is based on radio related measurements, since no signaling of input parameters to the power balancing scheme is required over the radio interface.

A main idea behind the invention is that each access point provides conventional power control (stepwise increase or decrease of transmission power) in each channel only if it has been assigned a token. In combination with the conventional power control, the power balancing scheme is used to avoid a global increase or decrease of interference in a multi-cell environment. In accordance with the invention power control in combination with power balancing does not pertain to one cell only, but to many cells and is coordinated among the many cells. The invention provides a solution of power balancing for different radio network configurations in multi-cellular radio access technologies with particular advantage in interference limited systems such as OFDMA, CDMA etc.

The token-based power balancing method ensures system stability by preventing sudden increase or decrease in co-channel interference in multi-cell interference limited systems such as OFDMA and CDMA with tight frequency reuse, e.g. reuse 1 or reuse 3.

The inventive power balancing method makes efficient use of downlink power resource.

The inventive power balancing method balances the interference and satisfies the different cell's throughput requirements.

Throughout the specification and claims the term "channel" is a frequency, a time slot, a frequency chunk, an orthogonal code or other channel manifestation depending on the access technique used in the cellular system.

A cell's "throughput" is often measured in terms of total sum of the number of successful bits received per unit time in the cell.

DETAILED DESCRIPTION OF EMBODIMENTS

The invention will in the following be described with reference to a cellular system comprising a plurality of AP:s, access points, 1, an APC, access point controller, 2, a plurality of cells A, B, . . . I, and in each cell a plurality of mobile UE:s, user equipments, 3.

(In an OFDMA based radio access network the counterpart of the APC is a RNC and of AP is a Node-B.)

The AP:s are distributed over a large area and communicate with the APC via non-shown land lines and with the UE:s via radio.

The APC comprises a scheduler that assigns frequency chunks to an AP. An AP is typically assigned a plurality of frequency chunks on which it communicates with the UE:s it serves. A communication with an UE takes place over an downlink and an uplink respectfully.

Frequency chunks are typically used in a frequency hopping system in which the transmission in the downlink hops from one frequency chunk to another during an ongoing communication. The frequency chunks used for hopping are selected in order to combat frequency selective fading. Such fading is typically a consequence of the movement of an UE.

Figure 2:
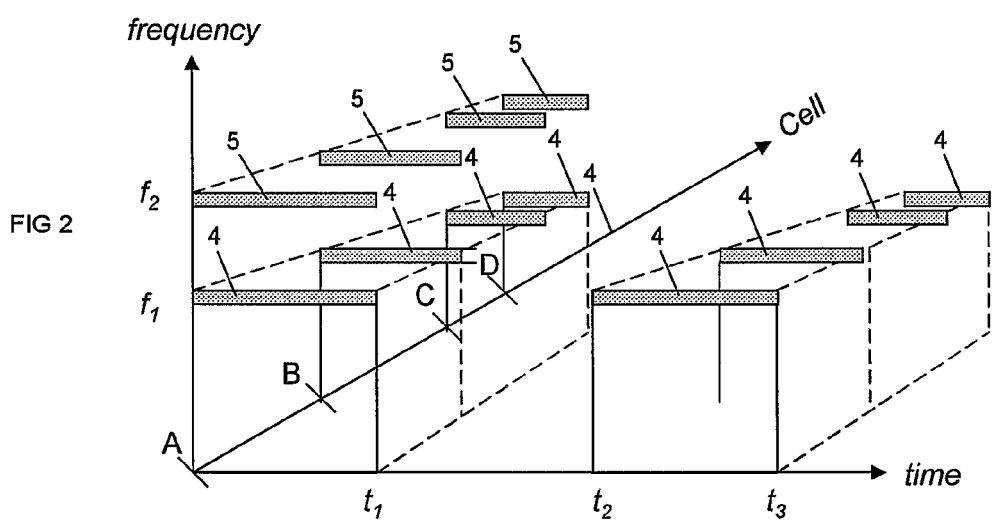
FIG. 2 is a three dimensional view illustrating frequency chunks.

FIG. 2 illustrates schematically the term frequency chunk. The frequency range is divided into frequency chunks and each chunk comprises a plurality of sub-carriers.

Exemplary and only in order to give a general picture only, the complete band width allotted the cellular system may be 10 MHz and a frequency chunk may have a bandwidth of 200-400 kHz. If the band width of a chunk is 300 kHz and the bandwidth of a chunk is 15 KHz there are 20 sub-carriers on each frequency chunk.

In FIG. 2 a chunk 4 at frequency band $f_1$ is shown to be used simultaneously by the AP:s of cells A, B, C and D during the time period $0$-$t_1$. Another chunk 5 is also used simultaneously by the same AP:s of cells A-D during the same time period. An AP in one cell can thus use a plurality of chunks at the same time. Another AP in another cell can use the same frequency chunks during the same time period.

Figure 1:
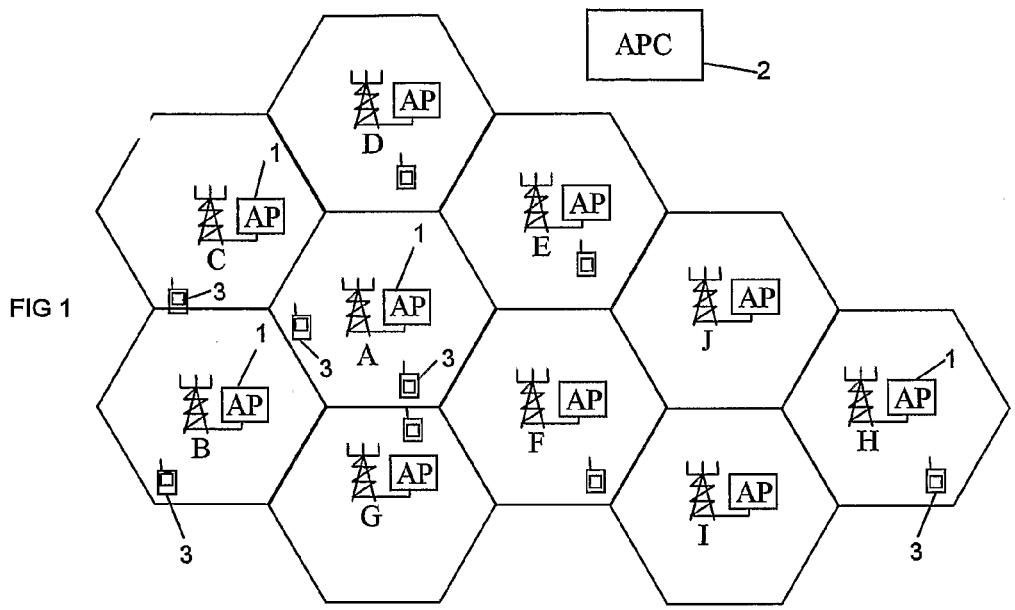
FIG. 1 is a schematic view of a cellular system.

The right part of FIG. 1 illustrates the use of chunk 4 at cells A-D at another time period $t_2$ to $t_3$. In order not to blur the figure chunk 5 is not shown at this time period. It should be noted that during time period $t_1$ to $t_2$ cells A-D may use more chunks than chunks 4 and 5.

The APC assigns chunks to an AP, provides each chunk with an ID and signals the ID:s to the AP.

In the following the invention will be described with a frequency chunk reuse of 1, that is a chunk is used in all of the cells A-I. A reuse of 3 indicates the same chunk is not used in consecutive cells. One may even have a re-use less than one, for example ½, which means the same chunk is used twice in the same cell. A re-use of chunks from about 3 to a re-use of ½ or less can be regarded as tight re-use of frequency chunks.

Since the same chunk 4 is used in cells that are neighbours and neighbours to neighbours it follows that simultaneous transmission on chunk 4 in cell A will cause interference on chunk 4 in its neighbouring cells B-G. Conversely transmission on chunk 4 in any of cells B-G will cause interference on chunk 4 in cell A. Such interference is referred to as co-interference. In addition to co-interference a cell is also subject of interference from other sources. Transmission with a high RF power on chunk 4 in cell A will thus cause co-channel interference in the cells B-G surrounding cell A. Likewise transmission with high RF power on chunk 4 in any of cells B-G will cause co-channel interference in cell A. In accordance with the invention the transmission power on chunk 4 should be balanced among the cells A-G. Too low RF power on chunk 4 in cell A is not good, since this will make cell A susceptible to co-channel interference as well as other interference. Also the throughput of cell A will be low in such a case.

Although the above interference and co-interference discussion concerned cells A-G it should be clear that the same reasoning applies to each individual cell in the system.

In accordance with the invention the RF power used on a frequency chunk should be balanced among the cells of the system. Further, the RF power used on all frequency chunks should be balanced among the cells of the system. Accordingly a global RF power balancing is desirable. In a wide sense the same RF power should be used on all chunks in all cells. To this end the invention proposes an RF power balancing scheme.

Further to assigning an identified chunk to an AP the APC assigns a predefined RF power to be used on the chunk in an individual cell. Thus each cell may transmit on the same chunk using different power levels (depending on the configured cell size). As stated above a cell may be assigned many different chunks and the RF power assigned to the chunks in the same cell should, in a wide sense, be the same.

In accordance with the invention an AP increases or decreases the RF power for a frequency chunk only if the AP has been assigned a token $\Gamma$ for that particular chunk. On the other hand if the AP does not have the token, the RF power of the corresponding chunk remains constant. The token $\Gamma$ can be either 0 or 1. Hence a token is assigned to an AP by setting $\Gamma$ to 1, otherwise the token is not assigned. The same token can be assigned to one AP or to a group of AP:s. The group of AP:s, which are assigned the token can be localized or can also be distributed in a region.

Figure 3:
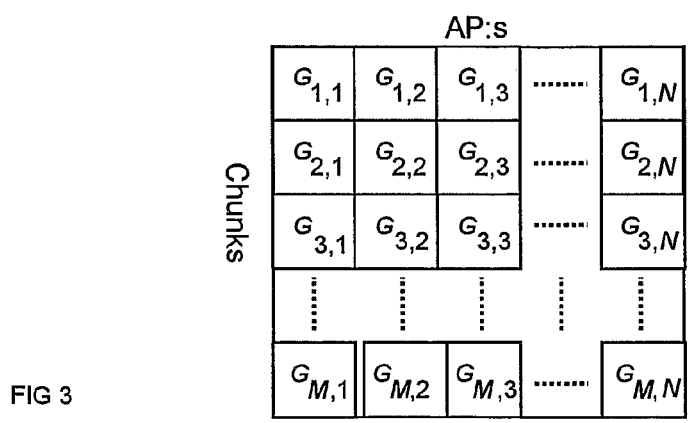
FIG. 3 is a matrix showing token assignment.

Token can be assigned for each available a frequency chunk within the AP. In this case then token assignment will comprise of a two dimensional vector $\Gamma_{i,j}$, where i and j are AP and chunk respectively. FIG. 3 illustrates a two dimensional token assignment assuming N total AP:s and M maximum chunks available per AP.

A token can also be a three dimensional vector $(\Gamma_{i,j,k})$, where i, j and k are AP, chunk and UE respectively. This means the token can also be UE specific.

In case of multiple transmit antenna scenario, such as MIMO or beam forming the token can also be a four dimensional vector $(\Gamma_{i,j,k,l})$, where i, j, k and/are AP, chunk, UE and beam/antenna respectively.

Power Allocation.

Once the AP gets a token any conventional power allocation algorithm can be used to allocate power to its UE:s. As an example one such conventional power allocation algorithm is discussed below with reference to three-dimensional token assignment.

Let us consider a multi-cellular environment in which an AP i allocates power $P_{i,j,k}(t)$ on frequency chunk j to user k during time/scheduling interval t. The power allocated to the same user on the same chunk after an interval $\tau$, i.e. $P_{i,j,k}(t+\tau)$ is expressed as:

$$P_{i,j,k}(t+\tau) = P_{i,j,k}(t) + \Delta P_{i,j,k}(t+\tau) \quad (1)$$

where $\Delta P_{i,j,k}(t+\tau)$ is to be predicted in order to correctly allocate the instantaneous power. The $\Delta P_{i,j,k}(t+\tau)$ can be based on any suitable quality measurement reports such as CQI, SINR etc. The details of the power allocation algorithm is no part of this invention.

If $(\Gamma_{i,j,k}=1)$
   estimate $\Delta P_{i,j,k}$ in (1) using a conventional power control algorithm,
Else
   $\Delta P_{i,j,k}=0$ in (1) above; no change in power transmitted power.

In other words when an AP does not have the token it neither increases nor decreases its RF power, rather it continues to transmit with the previous RF power on the corresponding chunk to the corresponding UE.

If $\Delta p$ increases the increase must not be too large, because this will cause interference. Therefore thresholds are set, as will be discussed below.

It should be noted that a conventional power allocation algorithm, when active (token=1), allows the RF power on a chunk in an AP to be increased or decreased in predefined steps, for example in steps of 1 dB, in consequence of channel quality measurements taken at the UE at regular times, for example one measurement at each $\frac{1}{10}$ second. These measurements are reported by the UE:s to the AP and depending on measured channel quality the AP increases or decreases its transmit power until the channel quality corresponds to the one associated with the service used on the channel.

Power Balancing Schemes.

The object of a power balancing scheme was mentioned above. The AP:s report the transmit power they use to the APC and the APC uses a power balance scheme in order to mutually adjust the transmit power among the frequency chunks and cells so that co-channel interference is reduced and a reasonably high cell throughput is maintained. Power balance is achieved within about ½ second or some hundreds of milliseconds after the APC has received a report on the existence of a bad chunk. As noted above chunk is bad either if its transmit power is too high or too low as compared to a threshold. Three different power balancing schemes will be described, a token based assignment scheme base based on scheduled rules, a token based assignment scheme based on radio conditions and a token based assignment scheme based on transmit power.

Figure 8:
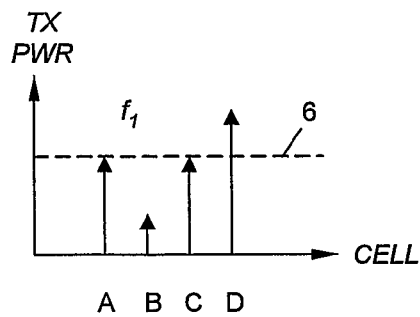
FIGS. 8-11 are similar diagrams as FIGS. 4-7 but now using transmission power as dependent variable and using token assignment based on radio transmission power.
Figure 9:
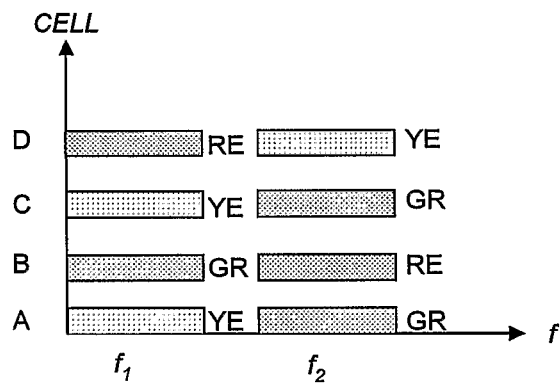
Figure 10:
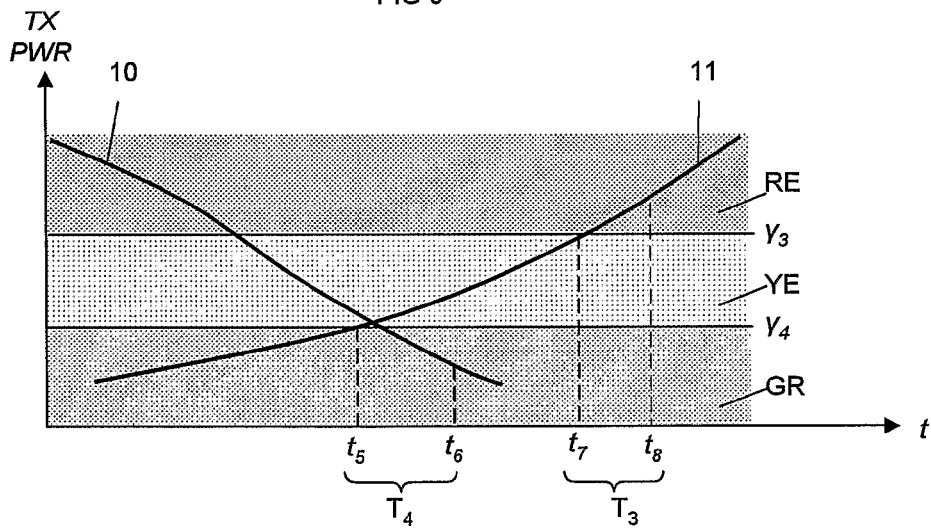

Power Balancing Based on Scheduled Rules:

Refer to FIG. 8. It illustrates the transmit power used on chunk 4 in cells A-D at a certain instant. Line 6 is a kind of desired average value for the transmit power on the chunk, as seen in a global perspective. The desired average value is thus not only for the shown four cells A-D but for all cells A-I of the system. The APC has this global view. Suppose all cells have been assigned a token, that is the transmit power is regulated according to the conventional power control scheme. In cell D the transmit power is too high since it exceeds line 6. The APC, knowing the transmit power used in cell D, therefore takes away the token from cell A following the scheduled rule. Taking away the token means the transmit power in cell A is freezed on the currently used transmit power. This has, hopefully, the effect that cell D can decrease its transmit power, thereby reducing co-channel interference. The APC waits to see how is the situation. If no power change takes place in cell D, then the APC takes away the token from another cell that is a neighbor of the bad cell D and waits to see if the transmit power at cell D reduces down to the desired global average value shown at line 6. The scheduled rule is such that tokens are taken away from the cells A, C, E etc., one at a time, which are neighbors to the bad cell D. Somehow the situation will stabilize in the multi-cell environment. When the situation has stabilized and transmit power in the cells generally is at the global average level the APC may re-assign tokens to the cell or cells from which the token was taken away.

This is a simple scheduled rule which may be modified in many ways. One modification of the rule would be to take away the tokens from two neighboring cells at a time until all neighboring cells have been deprived of tokens. Still another modification would be to take away tokens from a set of pre-defined cells surrounding the bad cell.

A power balancing scheme based on predefined rules or a predefined pattern reacts quickly, requires no overhead signaling, is easy to implement, but is not dynamic and may not be efficient as seen from cell throughput point of view.

Figure 6:
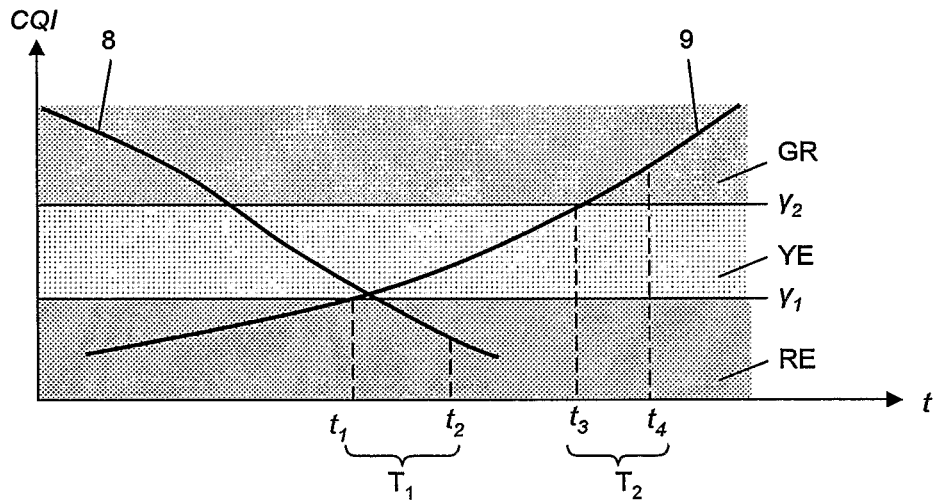
FIG. 6 is a diagram illustrating CQI versus time in a cell of the system.

Power Balancing Based on Radio Conditions:

Radio conditions are depicted by the previously mentioned downlink quality measurement reports from the UE. Quality measurements may relate to CQI, SINR, RSSI, received signal power, received interference etc. In this case the token is withdrawn from the AP on those chunks whose downlink quality falls below a certain level ($\gamma_1$) over time ($T_1$). The token can be re-assigned if the quality on this chunk becomes better than certain level ($\gamma_2$) over time ($T_2$). In FIG. 6 the levels $\gamma_1$ and $\gamma_2$ are shown.

Figure 4:
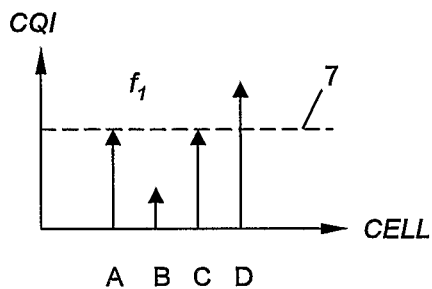
FIG. 4 is a diagram how a channel quality identifier CQI associated with a particular frequency chunk may vary from cell to cell when no power balancing scheme is used.

Refer to FIG. 4 which illustrates a situation wherein the vertical arrows represent the CQI for frequency chunk 4 at cells A-D as seen by the APC. Similar global aspects as discussed above apply, although only the situation at four cells is shown. Line 7 represents a global average value for CQI.

Figure 5:
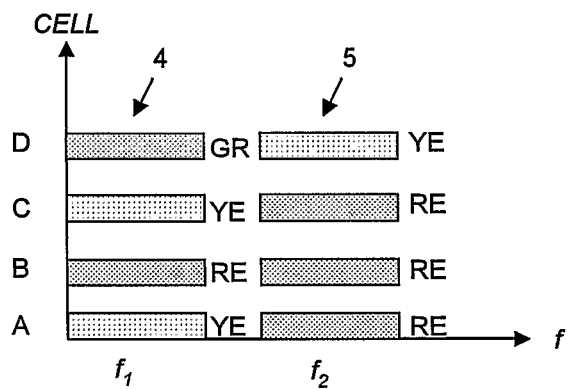
FIG. 5 is a diagram illustrates re-use of the same frequency chunk in different cells, the frequency chunk being shown at two different time instants.

Refer to FIG. 5 As shown the CQI Cell A is fair (=acceptable, colour marked YEllow), CQI in cell B is bad (=not acceptable, colour marked REd), cell C is fair (=acceptable, colour marked YEllow), and cell D is bad (=too good and therefore not acceptable, colour marked GReen). FIG. 5 illustrates the two chunks 4 and 5 in cells A-D; the left part of FIG. 5 being associated with FIG. 4 and with FIG. 6. In FIG. 5 the colour marking of the chunks is the same as that used in FIG. 6. As appears from FIG. 5 chunk 5, $f_2$, has other CQI ratings than chunk 4, $f_1$.

Figure 7:
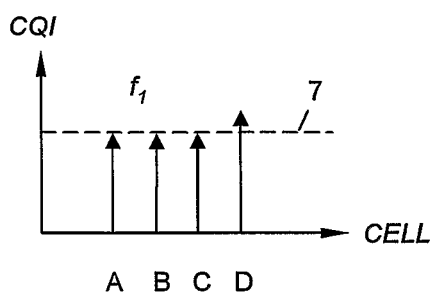
FIG. 7 is the same diagram as FIG. 5 but now after applying the present invention, using token assignment based on CQI.

Refer to FIG. 6 which is a diagram comprising of two curves 8 and 9 illustrating how the CQI varies over time; curves 8 and 9 are associated with chunk 4 and a particular UE in cell B. A high threshold value $\gamma_1$ and a low threshold value $\gamma_2$ are shown. A CQI value below $\gamma_1$ means the chunk is bad (REd), a CQI value above $\gamma_2$ means the CQI of the chunk is good (GReen) and a CQI value between $\gamma_1$ and $\gamma_2$ provides hysteresis and means the CQI of the chunk is fair (=YEllow). If the CQI falls and is in the red region RE below $\gamma_1$ for a time $t_2-t_1$ (=$T_1$) the APC withdraws the token from chunk $f_1$ in the closest neighbor of cell B, that is either from cell A, or another cell, or from both depending on the particular radio condition based power balancing scheme. Time instants $t_1-t_3$ in FIG. 6 are different from those shown in FIG. 2. The APC knows the transmit power used on chunk 4 by the cells and therefore no overhead signaling is required for the ARC to withdraw the token (or tokens). Say the token is withdrawn (token=0) from cell A, the AP in cell A freezes its transmit power on its current value, that is the AP continues to transmit on chunk 4 with the power value it had when the token was withdrawn. Following the withdrawal of the token from cell A the APC checks the result on the system using a global perspective. In particular the APC checks to see if the CQI distribution in FIG. 4 has changed. Hopefully it has and the CQI distribution now looks as in FIG. 7, wherein the CQI is about the same in all cells. The CQI of cell D has decreased slightly, but is still acceptable.

By withdrawing the token from the neighbor cell A the co-channel interference to cell B will decrease, which in turn improves CQI in cell B. Other cells may also be influenced since they have their power control active. If the improvement in CQI at cell B persists in the green region GR for a time longer than $t_4-t_3$ (=$T_2$ for curve 9) the APC now re-assigns (token=1) a token to cell A.

A token is neither assigned nor withdrawn if the quality level of a chunk is between level $\gamma_1$ and $\gamma_2$, that is if the quality falls within the yellow region YE.

In the absence of token the transmit power remains the same as discussed above. Thus UE measurement reports, e.g. CQI, RSSI, for the purpose of power allocation are not needed when the AP does not have the tokens for the corresponding chunks.

A UE reports the measurement, e.g. CQI, RSSI, only if its access point has the token (and there is no other requirement for the CQI reports). The period during which the UE reports its CQI is decided by AP and/or APC and depends on the power control scheme. The period can be a fixed value or can be based on some probability either selected by the AP or set by APC. The reporting period is either broadcast by the AP or is sent to the UE by the AP and/or APC using a UE specific signaling mechanism. The mechanism reduces the number of measurement reports, uplink transmit power, processing at the UE and AP when UE measurement reports are not needed.

The power balancing scheme managed by the APC may be so designed that the token is withdrawn from more than one neighbors as mentioned above. The APC can even withdraw the token from all closest neighbors, e.g. from cells C, A and G in FIG. 1. This will certainly have impact on cell B's CQI.

It should be understood that an operator has to properly tune parameters such as $\gamma_1$ and $\gamma_2$, $t_1$, $t_2$, $t_3$ and $t_4$ for the cellular system when deploying the power balancing scheme. Once this has been done the APC will know how many neighbor cells from which tokens need to be withdrawn when CQI quality goes down into the red region RE.

The power distribution scheme works like this: CQI measurements are reported to the AP. The AP uses the reports for resource allocation and other purposes, such as ARQ and retransmission. Normally the AP does not forward the CQI reports to the APC, but when the CQI goes above $\gamma_2$ or below $\gamma_1$ for a certain time, then this event is reported back to the APC. This means that as long as no events are reported to the APC on a particular chunk in a particular cell, then the chunk is in the yellow region YE. When a token is withdrawn signaling may be reduced by telling the UE not to report the measurement used for conventional power control.

Power Balancing Based on Transmit Power:

A token is not assigned (=is withdrawn from) to an AP for a chunk if the power transmitted on this chunk stays above certain level ($\gamma_3$) over a certain time ($T_3$). The token can be re-assigned if the transmit power becomes lower than certain level ($\gamma_4$) overtime ($T_4$).

Figure 11:
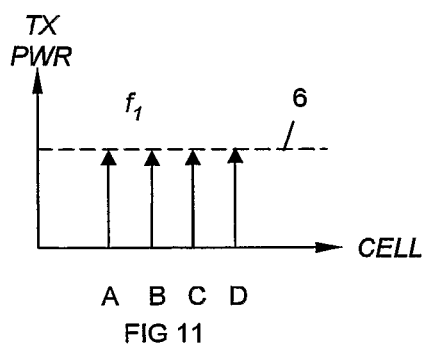

Refer to FIGS. 8-11. Curves 11 and 12 relate to chunk 4 for cell D. This time chunks associated with too high and too low transmit power are classified as bad since a high transmission power generates interference in neighboring cells. Therefore chunk 4 in cell D is bad (colour marking REd in FIG. 9). Following the power balancing scheme the token associated with chunk 4 in cell D is taken away (token is set to zero) if it lies in the red region RE for a time longer than $t_8-t_7$ (=$T_3$). After the token has been taken away by the APC, the APC waits and checks if the distribution shown in FIG. 8 is changed. Hopefully it changes and looks as shown in FIG. 11. The power balancing scheme can re-assign the token to cell D if the transmit power falls below $\gamma_4$ for a time period longer than $t_6-t_5$ (=$T_4$). When transmit power for a chunk falls below $\gamma_4$ interference in neighboring cells goes down and the chunk is classified as green GR.

A token is neither assigned nor withdrawn if the quality level of a chunk is between level $\gamma_3$ and $\gamma_4$, that is if the quality falls within the yellow region YE.

Similarly a too low transmit power, like in cell B, is not good since it makes the system unstable. Therefore the token is taken away from cell B and hopefully the global power distribution is changed by this measure. The token can be re-assigned to cell B if the transmit power goes up above the lower threshold $\gamma_4$ for a certain time.

A power transmission scheme based on radio conditions or based an transmit power provides dynamic taking away of tokens and dynamic re-assignment of tokens, increases the throughput of the cells and brings stability into the system.

The only difference between a CQI based and a transmit power based power balancing scheme is that in the latter case the token is taken away from the chunks which transmit with a too low (green region GR) or too high (red region RE) RF power. In the former case, when CQI is bad on a chunk, we take away the token from the neighbor cell with a good CQI.

Figure 12:
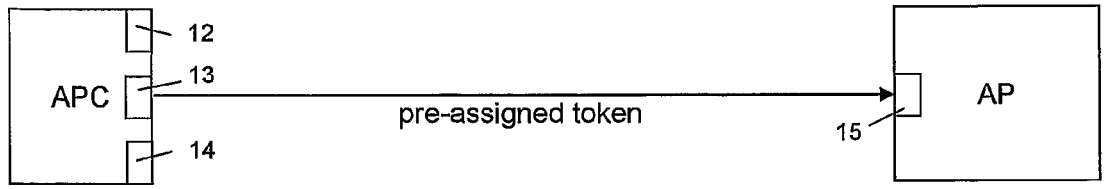
FIGS. 12-16 are signaling schemes for power balancing schemes based on predefined patterns, radio conditions, or transmit power.
Figure 13:
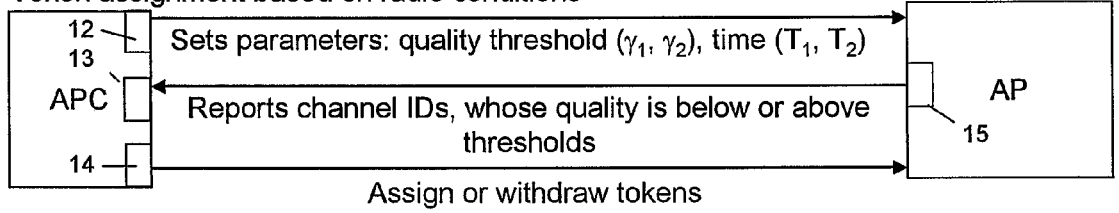
Figure 14:
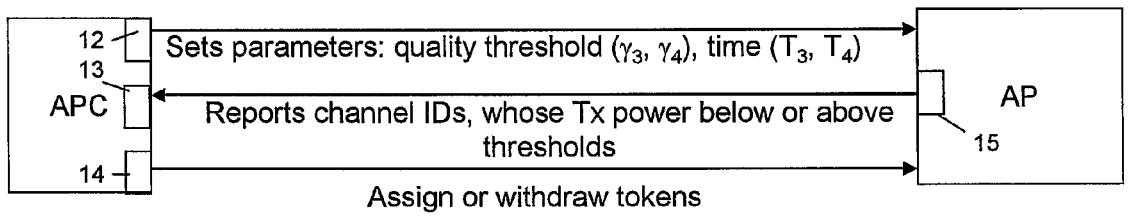
Figure 15:
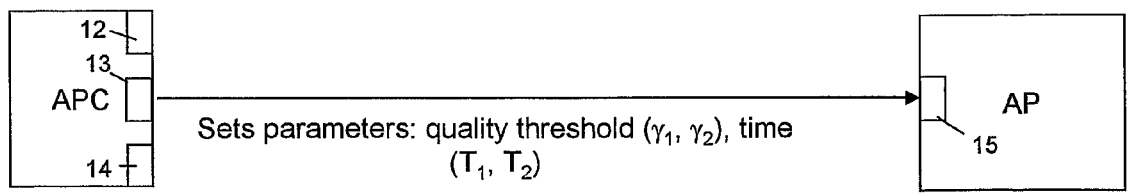
Figure 16:
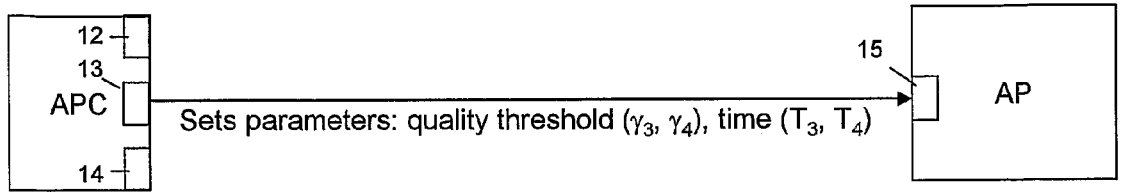

FIGS. 12-14 are signaling scheme illustrating the information exchanged between an AP and the APC in case of any of the three discussed power balancing schemes. FIGS. 15 and 16 illustrates the signaling between the APC and an AP when the parameters $\gamma_1$, $\gamma_2$, $\gamma_3$ and $\gamma_4$ and corresponding time periods are set. In the figures the APC comprises means 12 for assigning and re-assigning a token to a frequency chunk, receiving means 13 and a power balancing scheme 14. The receiving means interacts with the power balancing means and identifies the ID of the chunks whose tokens are to be assigned/re-assigned or taken away. An access point comprises means 15 for receiving information on tokens to be assigned/re-assigned or taken away from individual frequency chunks.

Architectural Consideration of the Radio Access Network in Token Assignment:

The network entity, which assigns the tokens to the AP:s depends upon the radio network topology and configuration as discussed below:

RAN Architecture with Central Node

Figure 17:
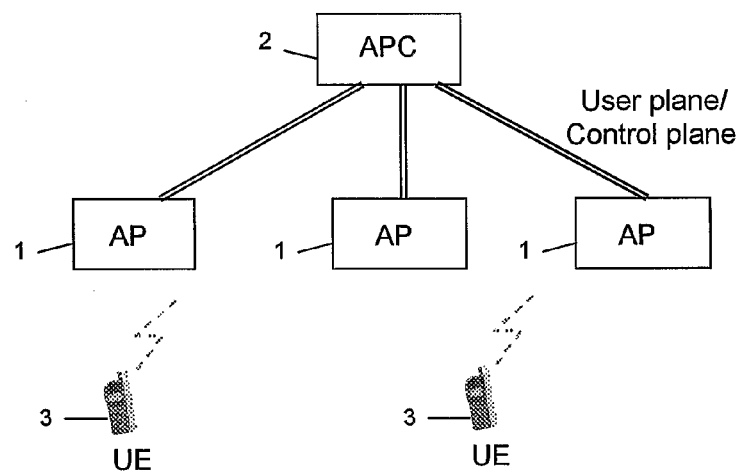
FIG. 17 is an radio access network architecture with a central node for assignment of tokens.

In FIG. 17 there is a central node APC bearing all radio related information. The APC assigns the token (associated with an individual chunk) to the AP:s. The APC gathers various measurement reports from AP:s, UE:s or both. The measurement reports comprise CQI, SINR, transmit power, RSSI values etc., as discussed above. The APC receives the measurement reports on event triggered or periodic basis. Based on these measurement reports the APC has a global radio related knowledge (e.g. interference level) of all the channels or chunks used in different AP:s. The APC then assigns the tokens to various AP:s with the aim of balancing the co-channel interference across the whole bandwidth. The assignment of token by the APC requires exchange of signaling between RNC, AP:s and UE as illustrated in FIGS. 12-16.

Figure 18:
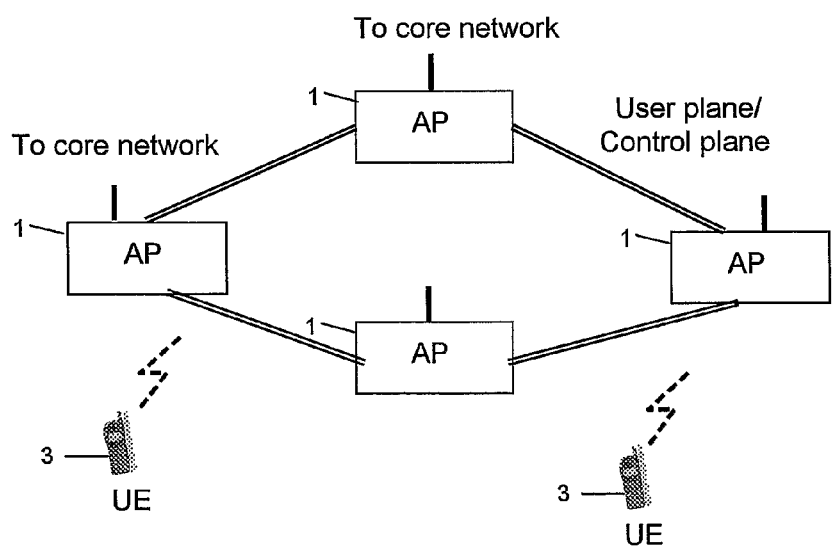
FIG. 18 is a radio access network architecture without a central node, wherein token assignment is done through coordination between access points.

RAN Architecture without Central Node:

In a radio access architecture, where AP:s are connected through ring topology as shown in FIG. 18. the token assignment is exercised through co-ordination between the AP:s. In this case the AP:s exchange information related to the radio conditions on various chunks or channels. The AP:s also receive the downlink radio quality measurement reports from the UE:s. Based on these measurement reports and inter-AP coordination the token is assigned to an AP or group of AP:s for a certain time $T_5$. After time $T_5$ the token is passed on to the other AP or group of AP:s that need the token.

In FIG. 18 one of the AP:s may also act as a master AP, which collects radio related information from all the AP:s and UE:s. Then the master AP assigns the token to the AP:s.

Figure 19:
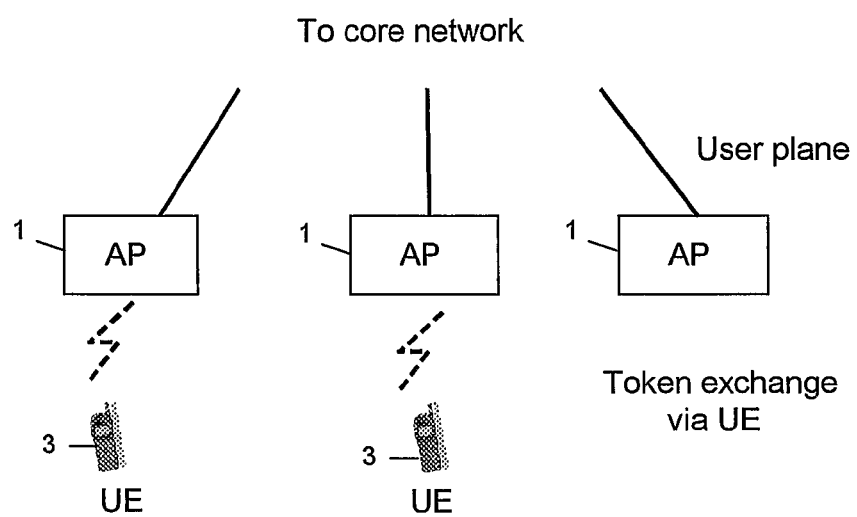
FIG. 19 is a completely distributed radio network access network architecture, wherein token assignment is through coordination between access points is made via user equipments.

Fully Distributed RAN Architecture:

In a fully distributed architecture as shown in FIG. 19, the coordination between the AP:s for the purpose of token assignment exercised by UE:s. The information related to the currently used and unused token in a cell is broadcast by the AP to the UE:s. The UE:s then send this information to other neighboring AP:s or to other UE:s in the neighboring cell, which finally send the information back to their own AP:s.

The invention may be varied and modified within the scope of the appending claims.

REFERENCES

[1] C. Yih and E. Geraniotis, "*Analysis of co-channel interference in multi-cell OFDM networks*," in *Proc.* IEEE PIMRC, September 1998, vol. 2, pp. 544-548.

[2] G. Kulkami and M. Srivastava, "Sub-Carrier and Bit Allocation Strategies for OFDM based Wireless Ad Hoc Networks," in Proc. IEEE Globcom, 2002.

[3] J. Zander, "Performance of Optimum Transmitter Power Control in Cellular Radio Systems", IEEE Transactions on Vehicular Technology, vol. 41, no. 1, February 1992.

[4] J. Rohwer, C. Abdullah, A. Al-Osery, "Power Control Algorithms in Wireless Communications".

[5] Sang-Hoon Sung, Joong-Ho Jeong, Yun-Sang Park, Soon-Young Yoon, Jae-Hwan Chang, "Apparatus and method for selective power control for an OFDM mobile communication system", US Patent Application Publication No. US2005/0105589 A1.

Abbreviations

ARQ: Automatic request for retransmission
UE: User Equipment
AP: Access Point
RAN: Radio Access Network
RNC: Radio Network Controller
CDMA: Code Division Multiple Access
CIR: Carrier to Interference Ratio
CQI: Channel Quality Indicator,
FER: Frame Erasure Ratio
OFDMA: Orthogonal Frequency Division Multiple Access
RF: Radio Frequency
RSSI: Radio Signal Strength Indicator
SINR: Signal to Interference and Noise Ratio

The invention claimed is:

1. A method of dynamic allocation of transmission power to user equipments (UEs) in a multi-cellular interference limited radio system with tight frequency reuse, the method comprising:
   allocating a radio channel to a UE within a cell and to one or more UEs within contiguous cells, the allocated radio channel thus being reused,
   controlling the transmission power on individually allocated radio channels following a conventional power control scheme,
   balancing the transmission power among the reused radio channels by dynamically assigning a token to or taking away the token from an individual active reused radio channel based on quality of or transmission power in the channel, wherein the token:
      (i) stops the conventional power control if taken away from the channel, and
      (ii) allows the conventional power control if assigned to the channel.

2. The method in accordance with claim 1, wherein the token assignment is based on a pre-assigned pattern.

3. The method in accordance with claim 1, wherein the token assignment is based on radio related measurement reports from access points and user equipments.

4. The method in accordance with claim 1, wherein the token assignment is based on radio transmission power level used at an access point.

5. The method in accordance with claim 2, wherein the token assignment scheme comprises withdrawal of the token from a reused channel whose downlink quality falls below a first level during a first time period and reassignment of the token if the quality on the reused channel becomes better than a second level during a second time period.

6. The method in accordance with claim 5, wherein the token is taken away on the reused channel in one of more cells neighbouring the cell whose downlink quality falls below the first level during the first time period and the token is reassigned if the downlink quality in one or more neighbour cells becomes better than the second level during the second period.

7. The method in accordance with claim 5, wherein the token is neither assigned nor withdrawn if the quality level is between the first level and the second level.

8. The method in accordance with claim 4, characterized in that the token assignment scheme comprises withdrawal of the token from the access point on a reused channel whose transmission power in the downlink increases above a third level during a third time period and re-assignment of the token if the transmission power on this channel becomes lower than a fourth level during a fourth time period.

9. The method in accordance with claim 8, wherein the token is neither assigned nor withdrawn if the transmission power level is between the third level and the fourth level.

10. The method in accordance with claim 1, wherein if the token is withdrawn from an individual reused radio channel a user equipment using this radio channel is ordered to stop reporting power control related measurement reports corresponding to this channel.

11. The method in accordance with claim 10, wherein an access point or access point controller transmits said order to the user equipment, the order indicating the time period during which the user equipment shall not report the measurement reports.

12. The method in accordance with claim 2, further comprising assigning the token to a group of access points.

13. The method in accordance with claim 12, wherein the group of access points are neighbouring cells or are distributed in a region.

14. The method in accordance with claim 1, wherein the token is assigned by a centralized controller or by direct inter-access point coordination or by inter-access point coordination via user equipments.

15. The method in accordance with claim 1, further comprising coordinating a plurality of networks entities, among these a radio network controller, access points and user equipments, to assign the token to an access point or a group of access points.

16. The method in accordance with claim 1, wherein tokens are assigned for each radio channel in a cell, each of the tokens then being a two dimensional vector of radio resources, an access point performing the power balancing step.

17. The method in accordance with claim 16, wherein the tokens are assigned for each user equipment, each of the tokens then being a three dimensional vector of radio resources.

18. The method in accordance with claim 17, wherein the tokens are assigned for each antenna beam, each of the tokens then being a four dimensional vector of radio resources.

19. A central controller node for use in a multi-cellular interference limited radio system with tight frequency reuse and one or more re-used radio channels, wherein the node comprises:
   a processor configured to:
      assign and re-assign a token to each re-used radio channel,
      implement a power balancing scheme for balancing transmission power among re-used channels, based on quality of or transmission power in the re-used channels,
      transmit the assigned or re-assigned tokens to active re-used channels; and
   wherein each of the tokens:
      (i) halts conventional power control if taken away from the re-used channels, and
      (ii) allows conventional power control if assigned to the reused channels.

20. The central controller node in accordance with claim 19, wherein the processor is further configured to receive reports on channel ID whose channel quality is below or above predefined threshold values over predefined time periods, and interact with the power balancing scheme.

21. The central controller node in accordance with claim 20, wherein the processor is further configured to receive reports on channel ID whose transmission power is below or above predefined threshold values over predefined time periods, and interact with the power balancing scheme.

22. An access point for use in a multi-cellular interference limited radio system with tight frequency reuse and one or more re-used radio channels, wherein the access point comprises:
   a processor configured to:
      implement conventional control of transmission power used in a downlink of individual radio channels allocated to user equipments,
      receive information on tokens to be assigned to or taken away from individual active re-used channels in the access point,
   wherein each of the tokens:
      (i) stops locally managed power control if taken away form the re-used channels, and
      (ii) allows locally managed power control if assigned to the re-used channels.

\* \* \* \* \*

UNITED STATES PATENT AND TRADEMARK OFFICE
CERTIFICATE OF CORRECTION

PATENT NO. : 8,520,579 B2
APPLICATION NO. : 12/158962
DATED : August 27, 2013
INVENTOR(S) : Kazmi et al.

It is certified that error appears in the above-identified patent and that said Letters Patent is hereby corrected as shown below:

In the Specifications

In Column 4, Line 1, delete "an" and insert -- a --, therefor.

In Column 5, Line 29, delete "and/are" and insert -- and l are --, therefor.

In Column 7, Line 10, delete "FIG. 5" and insert -- FIG. 5. --, therefor.

In Column 7, Line 35, delete "ARC" and insert -- APC --, therefor.

In Column 8, Line 61, delete "an" and insert -- on --, therefor.

In Column 9, Line 6, delete "illustrates" and insert -- illustrate --, therefor.

In Column 10, Line 3, delete "Globcom," and insert -- Globecom, --, therefor.

In the Claims

In Column 10, Line 65, in Claim 6, delete "one of more" and insert -- one or more --, therefor.

In Column 12, Line 16, in Claim 19, delete "channels;" and insert -- channels, --, therefor.

In Column 12, Line 45, in Claim 22, delete "form" and insert -- from --, therefor.

Signed and Sealed this
Twenty-fifth Day of March, 2014

Michelle K. Lee
*Deputy Director of the United States Patent and Trademark Office*